(12) United States Patent
Nowak et al.

(10) Patent No.: US 10,246,565 B2
(45) Date of Patent: Apr. 2, 2019

(54) RAPIDLY CURING ADHESIVES USING ENCAPSULATED CATALYST AND FOCUSED ULTRASOUND

(71) Applicant: THE BOEING COMPANY, Huntington Beach, CA (US)

(72) Inventors: Andrew P Nowak, Los Angeles, CA (US); Geoffrey P. McKnight, Los Angeles, CA (US); Carissa A. Pajel, Mill Creek, WA (US); Sophia S. Yang, Los Angeles, CA (US); Thomas I Boundy, Agoura Hills, CA (US); April R. Rodriguez, Marina Del Rey, CA (US); Darrin M Hansen, Seattle, WA (US); Alain A Adjorlolo, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 210 days.

(21) Appl. No.: 14/667,220

(22) Filed: Mar. 24, 2015

(65) Prior Publication Data
US 2016/0280867 A1   Sep. 29, 2016

(51) Int. Cl.
*C08J 3/28* (2006.01)
*C09J 4/00* (2006.01)
(Continued)

(52) U.S. Cl.
CPC .............. *C08J 3/28* (2013.01); *B05D 3/108* (2013.01); *B05D 3/12* (2013.01); *B05D 7/22* (2013.01); *B29C 35/0261* (2013.01); *C08F 220/18* (2013.01); *C08J 3/241* (2013.01); *C09J 4/00* (2013.01); *C09J 5/00* (2013.01);
(Continued)

(58) Field of Classification Search
CPC ...... C08J 3/28; C08J 2333/08; C08J 2363/02; C08J 2363/06; C08J 3/241; C08J 2363/04; C08J 2363/00; B29C 35/0261; B29C 35/02; B29C 66/41; B29C 65/483; B29C 65/485; B29C 66/7212; B29C 66/1122; B29C 65/08; C08F 220/18; B05D 7/22; B05D 3/108; B05D 3/12; C09J 163/00; C09J 5/00; C09J 11/06; C09J 4/00; C09J 2205/11;
(Continued)

(56) References Cited

U.S. PATENT DOCUMENTS 4,224,422 A   9/1980  Rude et al.
4,626,471 A   12/1986 Chao
(Continued)

FOREIGN PATENT DOCUMENTS

EP   0224382 A2   6/1987
EP   1411102 A1   4/2004
(Continued)

OTHER PUBLICATIONS

European Search Report for EP Application 15193609.3-1308 dated Jul. 25, 2016.
(Continued)

*Primary Examiner* — Jessica M Roswell
(74) *Attorney, Agent, or Firm* — Coats & Bennett, PLLC

(57) ABSTRACT

Methods for making and curing resin-based adhesives are disclosed using encapsulated amine accelerators activated by providing ultrasonic energy.

21 Claims, 5 Drawing Sheets

(51) Int. Cl.
| | |
|---|---|
| *B29C 65/08* | (2006.01) |
| *C09J 5/00* | (2006.01) |
| *C09J 11/06* | (2006.01) |
| *C09J 163/00* | (2006.01) |
| *B05D 3/10* | (2006.01) |
| *B05D 3/12* | (2006.01) |
| *B05D 7/22* | (2006.01) |
| *C08F 220/18* | (2006.01) |
| *B29C 35/02* | (2006.01) |
| *C08J 3/24* | (2006.01) |
| *B29C 65/48* | (2006.01) |
| *B29C 65/00* | (2006.01) |
| *B29L 31/30* | (2006.01) |
| *C08G 59/72* | (2006.01) |

(52) U.S. Cl.
CPC ............ *C09J 11/06* (2013.01); *C09J 163/00* (2013.01); *B29C 65/08* (2013.01); *B29C 65/483* (2013.01); *B29C 65/485* (2013.01); *B29C 66/1122* (2013.01); *B29C 66/41* (2013.01); *B29C 66/7212* (2013.01); *B29L 2031/3082* (2013.01); *C08G 59/72* (2013.01); *C08J 2333/08* (2013.01); *C08J 2363/00* (2013.01); *C08J 2363/02* (2013.01); *C08J 2363/04* (2013.01); *C08J 2363/06* (2013.01); *C09J 2205/11* (2013.01); *C09J 2205/31* (2013.01)

(58) Field of Classification Search
CPC ................ C09J 2205/31; C08G 59/72; B29L 2031/3082
See application file for complete search history.

(56) References Cited

U.S. PATENT DOCUMENTS

| | | | |
|---|---|---|---|
| 6,355,127 B1 | 3/2002 | Mahdi et al. | |
| 6,596,373 B1* | 7/2003 | Kishi | C08J 3/24 |
| | | | 428/116 |
| 6,896,659 B2 | 5/2005 | Conston et al. | |
| 6,929,609 B2 | 8/2005 | Asafusa | |
| 9,006,360 B2* | 4/2015 | Keledjian | B32B 15/08 |
| | | | 525/535 |
| 2007/0173602 A1 | 7/2007 | Brinkman et al. | |
| 2008/0294089 A1* | 11/2008 | Hardy | A61K 9/0009 |
| | | | 604/22 |
| 2008/0305362 A1 | 12/2008 | Schroeder et al. | |
| 2013/0041311 A1 | 2/2013 | Kohane et al. | |
| 2013/0330389 A1 | 12/2013 | Fabiilli et al. | |
| 2013/0345389 A1* | 12/2013 | Cai | C08G 75/12 |
| | | | 528/376 |
| 2016/0222328 A1* | 8/2016 | Last | C11D 3/505 |

FOREIGN PATENT DOCUMENTS

| | | |
|---|---|---|
| JP | 2011073191 A | 4/2011 |
| WO | 2004087826 A2 | 10/2004 |
| WO | 2015002749 A1 | 1/2015 |

OTHER PUBLICATIONS

Lensen D. et al. Biodegradable polymeric microcapsules for selective ultrasound-triggered drug release Soft Matter, 2011, 7, 5417 May 5, 2011.

Volodkin DM. Matrix Polyelectrolyte Microcapsules: New System for Macromolecule Encapsulation Langmuir 2004, 20, 3398-3406. Jan. 26, 2004.

Zhang H. et al. Silica encapsulation of n-octadecane via sol-gel process: A novel microencapsulated phase-change material with enhanced thermal conductivity and performance. Journal of Colloid and Interface Science 2010, 343, 246-255. Nov. 23, 2009.

Kolesnikova T.A. et al. Nanocomposite Microcontainers with High Ultrasound Sensitivity. Adv. Funct. Mater. 2010, 20, 1189-1195. Jan. 1, 2010.

Zhao, Du, Lu, Jin, Ge; Potential and problems in ultrasound-responsive drug delivery systems; International Journal of Nanomedicine 2013:8 1621-1633; Apr. 19, 2013.

Kricheldorf HR. (ed) Handbook of Polymer Synthesis: Part B. Marcel Dekker, New York. 1992, (Entire Volume For background purposes only); Dec. 31, 1992.

Bounds CO, Goetter R, Pojman JA, Vandersall M. Preparation and Application of Microparticles Prepared via the Primary Amine-catalyzed Michael Addition of a Trithiol to a Triacrylate. Journal of Polymer Science Part A: Polymer Chemistry 2012, 50, 409-422; Oct. 14, 2011.

Petrie EM. Epoxy Adhesive Formulations. McGraw Hill, New York. 2006. (Entire Volume for background purposes only); Dec. 31, 2006.

Odian. Principles of Polymerization 3rd Ed. John Wiley and Sons, New York. 1991 (Entire Volume for background purposes only); Dec. 31, 1991.

Petrie EM. Handbook of Adhesives and Sealants 2nd Ed. McGraw Hill, New York. 2007. (Entire Volume for background purposes only); Dec. 31, 2007.

\* cited by examiner

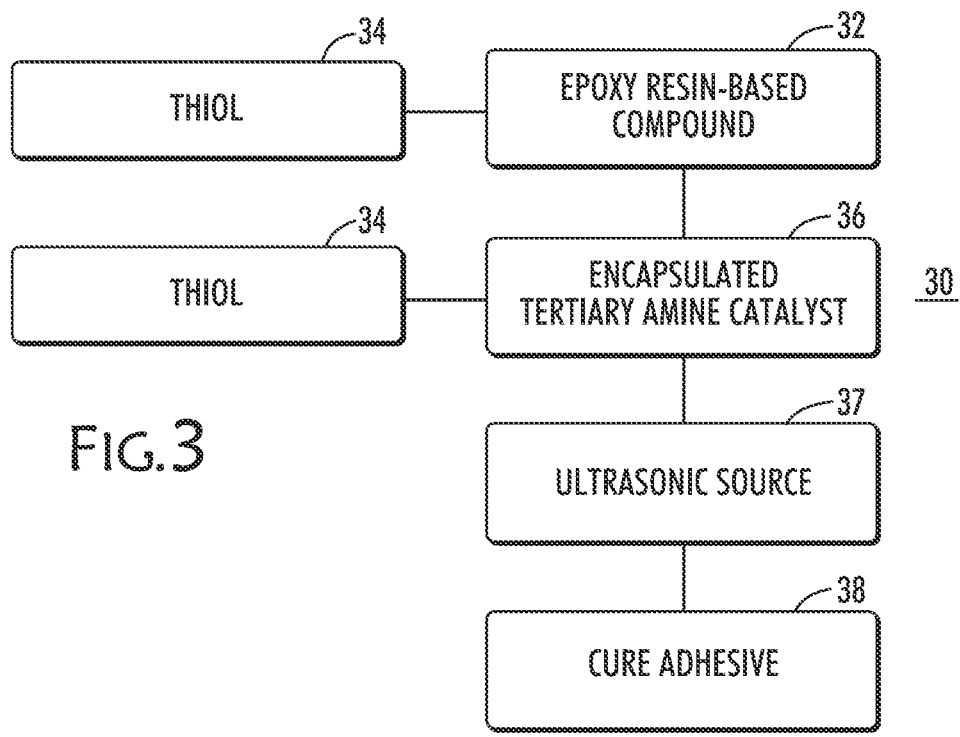
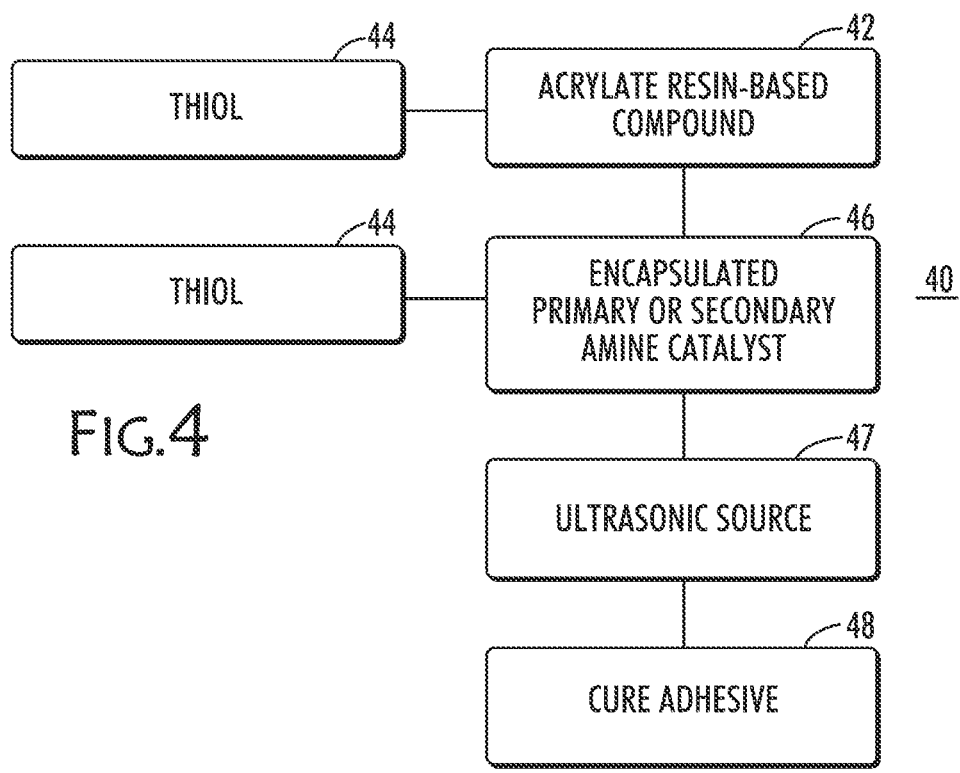

RAPIDLY CURING ADHESIVES USING ENCAPSULATED CATALYST AND FOCUSED ULTRASOUND

TECHNOLOGICAL FIELD

The present disclosure relates generally to the field of adhesives. More specifically, the present disclosure relates to rapidly curing, on-demand, adhesive systems that possess a non-thermal trigger, and that are delivered in a form awaiting triggering at a later time by applying ultrasonic (US) energy.

BACKGROUND

In the manufacture of component parts into a finished product, the presence of gaps may occur. In some instances such gaps are undesirable and must be eliminated. Generally, for gaps larger than about 3 mm, solid shims made out of thermoset plastic or prepreg are inserted into the gap. However, for gaps occurring that are smaller than about 3 mm, liquid shims are used. Liquid shims are typically epoxy-based structural adhesive materials that possess high compressive strength when the shims harden or "cure" to their final solid state. For purposes of liquid shims, a high compressive strength is considered to be greater than from about 8000 psi to about 14000 psi at 2% offset and at room temperature. It is understood that shims may be used to account for and fill gaps anywhere there exists a small dimensional mismatch between adjacent parts. Additionally, epoxy or acrylate resins may be used to modify or otherwise "build-up" areas of material surfaces, such as, for example, composite materials.

Traditional epoxy resins, and other adhesive resin curing systems are typically governed by understood curing kinetics. In the case of epoxy resins, the curing of epoxy resin systems is often governed by the curing kinetics of epoxy resins with multifunctional amines or thiol reactive groups that are often combined with a catalyst. Such adhesive systems have limited manufacturing flexibility due to the relationship between pot life and cure time. Pot life is understood to be the amount of time available to make an active epoxy system, and then apply it to the desired end use before the epoxy system "sets" or "cures" to the point where it becomes unworkable to apply (because the epoxy has hardened and will no longer "flow"). Therefore, highly accelerated epoxy resin adhesive system cure times inevitably lead to shorter, and often impractical, pot life times. Conversely, an epoxy resin system having a longer pot life takes a longer time to cure. Longer adhesive system cure times increase manufacturing time on a production line, and otherwise lead increased production inefficiency.

In addition, known epoxy resin- and acrylate resin-based adhesive systems may require heat to activate a system catalyst and "trigger" the curing reaction. In many manufacturing systems for large components, including the aerospace industry, presenting equipment capable of supplying evenly applied heat to such components of a certain dimension to trigger adhesive curing is not possible, not practical, or would significantly increase manufacturing cost.

An efficient and cost-effective on-demand adhesive system that is both rapid curing, and that also has a significantly long pot life would be useful, cost-effective and highly advantageous.

BRIEF SUMMARY

The present disclosure relates methods, systems, kits and apparatuses for controlling curing of epoxy resin- and acrylate resin-based adhesives through the use of encapsulated initiators that can be selectively triggered through the application of focused ultrasonic energy. For purposes of the present specification, it is understood that the terms "initiators", "accelerators" and "catalysts" are used equivalently.

According to one aspect, the present disclosure is directed to a method for making an adhesive comprising the steps of mixing a resin-based compound with an encapsulated catalyst to form an uncured resin-based adhesive, directing ultrasonic energy from an ultrasonic energy source to the uncured resin-based adhesive, rupturing the catalyst, and curing the uncured resin-based adhesive.

According to another aspect, the resin-based compound comprises an epoxy resin-based compound, and the encapsulated catalyst comprises a compound selected from the group including boron trichloride methyl amine, boron trichloride ethylamine, and homologues, boron trifluoride methyl amine, boron trifluoride ethylamine and homologues, boron trifluoride dimethylamine, boron trifluoride diethylamine, and homologues, boron trifluoride trimethylamine, boron trifluoride triethylamine, and homologues, boron trifluoride piperadine, boron trifluoride hexylamine, and combinations thereof.

In another aspect, the resin-based compound is an epoxy resin-based compound selected from the group including digylcidyl ethers of bisphenol A; dicgycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, and combinations thereof.

In yet another aspect, the step of mixing a resin-based compound with an encapsulated catalyst to form an uncured resin-based adhesive further comprises mixing a thiol-based curing agent with the epoxy resin-based compound, wherein the thiol-based curing agent is selected from the group including pentaerythritol tetrakis(3-mercaptopropionate); trimethylolpropane tris(3-mercaptopropionate); 1,3,4-thiadiazole-2,5-dithiol; poly(ethylene glycol) dithiol; toluene dithiol; benzene dithiol; 1,2-ethanedithiol (and increasing MW alkane dithiol); tris[2-(3-mercaptopropionyloxy)ethyl] isocyanurate (and other polyols grafted onto isocyanurate backbones), and combinations thereof, with the encapsulated catalyst selected from the group including N,N dimethyldodecyl amine and homologues; DBU (1,8-Diazabicyclooundec-7-ene); DBN (1,5-diazabicyclo[4, 3, 0]non-5-ene; trienthanolamine; piperazine; dimethylimidazol; 1-methylimidazole; nonylphenol; 1-(2-aminoethyl) piperazine, and combinations thereof.

According to another aspect, the present disclosure is directed to a method for making an adhesive comprising the steps of mixing a resin-based compound, wherein the resin-based compound comprises an acrylate-based compound, The acrylate resin-based compound is mixed with an encapsulated catalyst and a thiol-based curing agent, wherein the thiol-based curing agent is selected from the group including pentaerythritol tetrakis(3-mercaptopropionate); trimethylolpropane tris(3-mercaptopropionate); 1,3,4-thiadiazole-2,5-dithiol; poly(ethylene glycol) dithiol; toluene dithiol; benzene dithiol; 1,2-ethanedithiol (and increasing MW alkane dithiol); tris[2-(3-mercaptopropionyloxy)ethyl] isocyanurate (and other polyols grafted onto isocyanurate backbones), and combinations thereof. The encapsulated catalyst is selected from the group including aliphatic primary amines, aliphatic secondary amines, and combinations thereof.

According to a further aspect, the acrylate resin-based compound is selected from the group including monoacrylates, diacrylates, triacrylates, tetraacrylates, pentaacrylates and combinations thereof.

In yet another aspect, the ultrasonic energy source emits ultrasonic energy in the range of from about 0.5 to about 50 MHz.

According to another aspect, the present disclosure is directed to a method for applying and curing an adhesive comprising the steps of, mixing a resin-based compound with an encapsulated catalyst to form an uncured adhesive material applying the uncured adhesive material onto an interior surface of a first component having an interior surface and an exterior surface, positioning an ultrasonic energy source proximate to the exterior surface of the component, directing ultrasonic energy from an ultrasonic energy source to the uncured adhesive material, rupturing the encapsulated first catalyst, and curing the uncured adhesive material.

In a further aspect, the present disclosure is directed to the above-recited method and further comprising the step of, prior to directing ultrasonic energy, applying the uncured adhesive material onto an interior surface of a second component having an interior surface and an exterior surface substantially simultaneously with the step of applying the uncured adhesive material onto an interior surface of a first component having an interior surface and an exterior surface, with the second component oriented proximate to the first component, such that a gap exists between the interior surface of the first component and the interior surface of the second component.

According to another aspect, the ultrasonic energy source emits ultrasonic energy in the range of from about 0.5 to about 50 MHz.

In a further aspect, the present disclosure is directed to an uncured adhesive material that is curable on-demand. The uncured adhesive material comprises, in a mixture, a resin-based compound and an encapsulated catalyst, wherein the catalyst is encapsulated within a shell, said shell having an average shell diameter of from about 0.1 to about 1000 microns, and said shell having an average shell wall thickness of from about 1 to about 10% of the shell diameter, and wherein the shell ruptures when a predetermined amount of energy is received by the shell from an ultrasonic energy source.

In a further aspect, the resin-based compound comprises an epoxy resin-based compound, and the encapsulated catalyst is a compound selected from the group including boron trichloride methyl amine, boron trichloride ethylamine, and homologues, boron trifluoride methyl amine, boron trifluoride ethylamine and homologues, boron trifluoride dimethylamine, boron trifluoride diethylamine, and homologues, boron trifluoride trimethylamine, boron trifluoride triethylamine, and homologues, boron trifluoride piperadine, boron trifluoride hexylamine, and combinations thereof.

In yet another aspect, the resin-based compound comprises an epoxy resin-based compound selected from the group including: digylcidyl ethers of bisphenol A; dicgycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, and combinations thereof.

In another aspect, the present disclosure is directed to an adhesive material comprising an epoxy resin-based compound, and a thiol-based curing agent mixed with the epoxy resin-based compound, wherein the thiol-based curing agent is selected from the group consisting of: pentaerythritol tetrakis(3-mercaptopropionate); trimethylolpropane tris(3-mercaptopropionate); 1,3,4-thiadiazole-2,5-dithiol; poly (ethylene glycol) dithiol; toluene dithiol; benzene dithiol; 1,2-ethanedithiol (and increasing MW alkane dithiol); tris [2-(3-mercaptopropionyloxy)ethyl]isocyanurate (and other polyols grafted onto isocyanurate backbones), and combinations thereof. In another aspect the encapsulated catalyst is selected from the group consisting of N,N dimethyldodecyl amine and homologues; DBU (1,8-Diazabicycloundec-7-ene); DBN (1,5-diazabicyclo[4, 3, 0]non-5-ene, trienthanolamine, piperazine, dimethylimidazol, 1-methylimidazole; nonylphenol; 1-(2-aminoethyl) piperazine; ECA-39; Accelerator, and combinations thereof.

In yet another aspect, the present disclosure is directed to an uncured adhesive material that is curable on-demand, with the uncured adhesive material comprising in a mixture, a resin-based compound and an encapsulated catalyst, wherein the catalyst is encapsulated within a shell, with the shell having an average shell diameter of from about 0.1 to about 1000 microns, and the shell having an average shell wall thickness of from about 1 to about 10% of the shell diameter, and wherein the shell ruptures when a predetermined amount of energy is received by the shell from an ultrasonic energy source. According to one aspect, the resin-based compound comprises an acrylate resin-based compound, and a thiol-based curing agent is mixed with the resin-based compound and encapsulated compound, and the thiol-based curing agent is selected from the group consisting of: pentaerythritol tetrakis(3-mercaptopropionate); trimethylolpropane tris(3-mercaptopropionate); 1,3,4-thiadiazole-2,5-dithiol; polyethylene glycol) dithiol; toluene dithiol; benzene dithiol; 1,2-ethanedithiol (and increasing MW alkane dithiol); tris[2-(3-mercaptopropionyloxy)ethyl]isocyanurate (and other polyols grafted onto isocyanurate backbones), and combinations thereof. The encapsulated catalyst is selected from the group including, aliphatic primary amines, aliphatic secondary amines, and combinations thereof. According to a further aspect, the acrylate resin-based compound is selected from the group comprising: monoacrylates, diacrylates, triacrylates, tetraacrylates, pentaacrylates and combinations thereof, and the ultrasonic energy source emits ultrasonic energy in the range of from about 0.5 to about 50 MHz.

According to another aspect, the present disclosure is directed to a resin-based adhesive material that is curable on-demand, with an adhesive precursor material comprising an epoxy or acrylate resin-based compound, a catalyst that is encapsulated wherein the catalyst is encapsulated within a shell, and the shell having an average shell diameter of from about 0.1 to about 1000 microns, and said shell having an average shell wall thickness of from about 1 to about 10% of the shell diameter, and wherein the shell can be ruptured when a predetermined amount of ultrasonic energy is received by the shell from an ultrasonic energy source.

According to a further aspect, the present disclosure is directed to a component comprising a resin-based adhesive material that is curable on-demand, with the adhesive material comprising an epoxy resin- or an acrylate resin-based compound, a catalyst that is encapsulated wherein the catalyst is encapsulated within a shell, said shell having an average shell diameter of from about 0.1 to about 1000 microns, and said shell having an average shell wall thickness of from about 1 to about 10% of the shell diameter, and wherein the shell can be ruptured when a predetermined amount of ultrasonic energy is received by the shell from an ultrasonic energy source.

In a further aspect, the present disclosure is directed to objects comprising an epoxy or acrylate resin-based adhesive material that is curable on-demand, with the adhesive material comprising an epoxy resin-based compound, a catalyst that is encapsulated wherein the catalyst is encapsulated within a shell, said shell having an average thickness of from about 0.1 to about 1000, and said shell having an average shell wall thickness of from about 1 to about 10% of the shell diameter, and wherein the shell can be ruptured when a predetermined amount of ultrasonic energy is received by the shell from an ultrasonic energy source. The contemplated objects include, but are not limited to vehicles, such as, for example, aircraft, spacecraft, satellites, rockets, missiles, etc. and therefore include manned and unmanned aircraft, spacecraft, terrestrial, non-terrestrial, and even surface and sub-surface water-borne vehicles, etc.

BRIEF DESCRIPTION OF THE DRAWINGS

Figure 1:
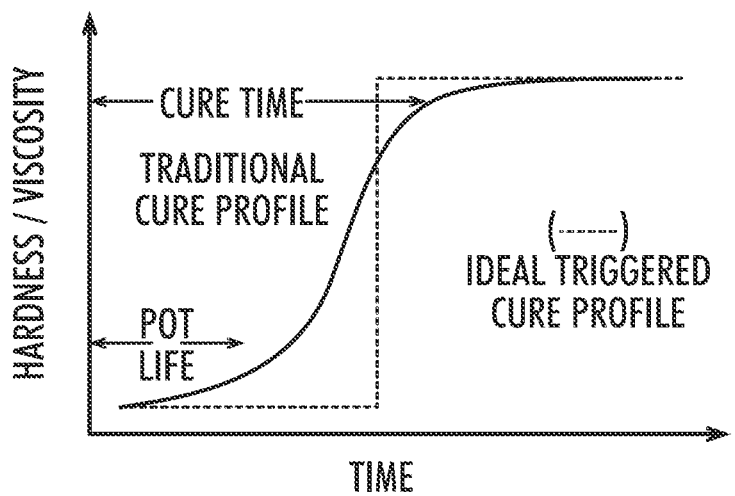
Figure 2:
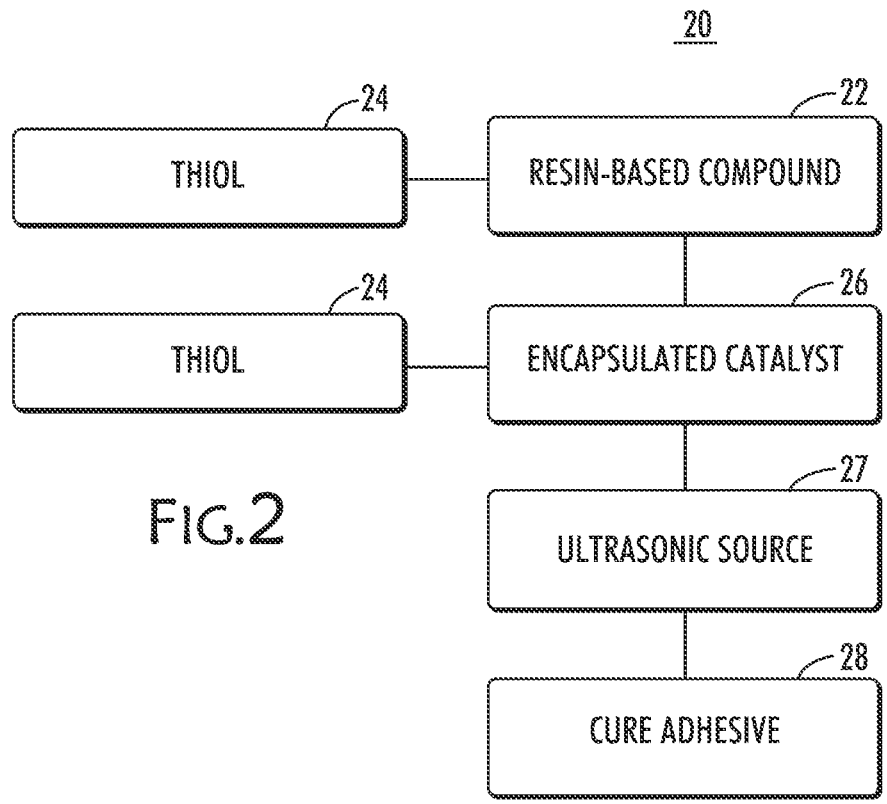
Figure 5:
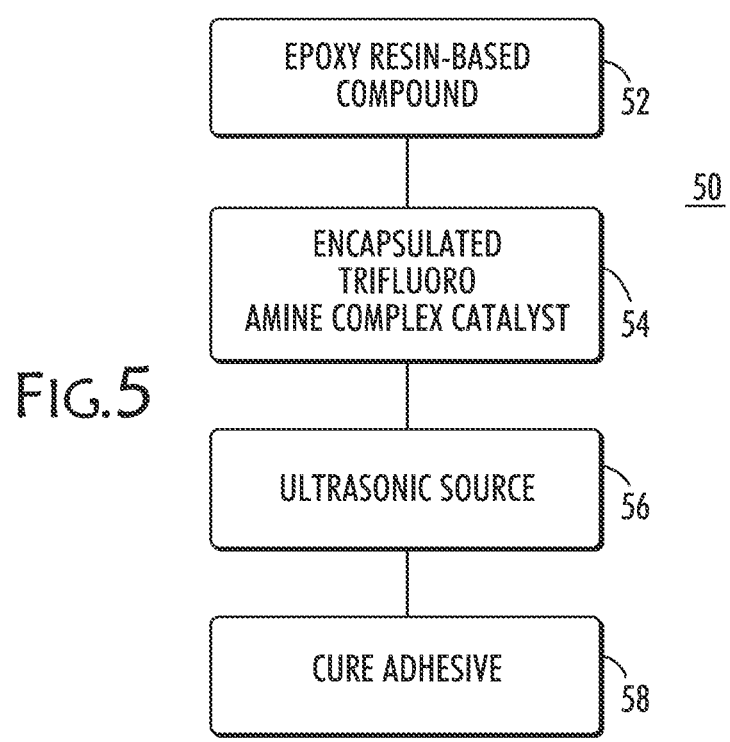
Figure 6:
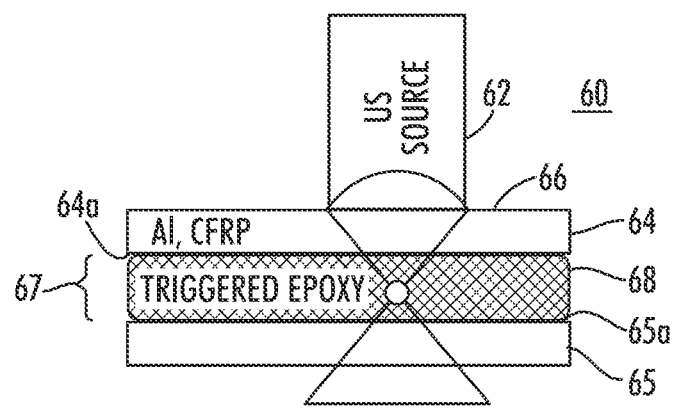
Figure 7:
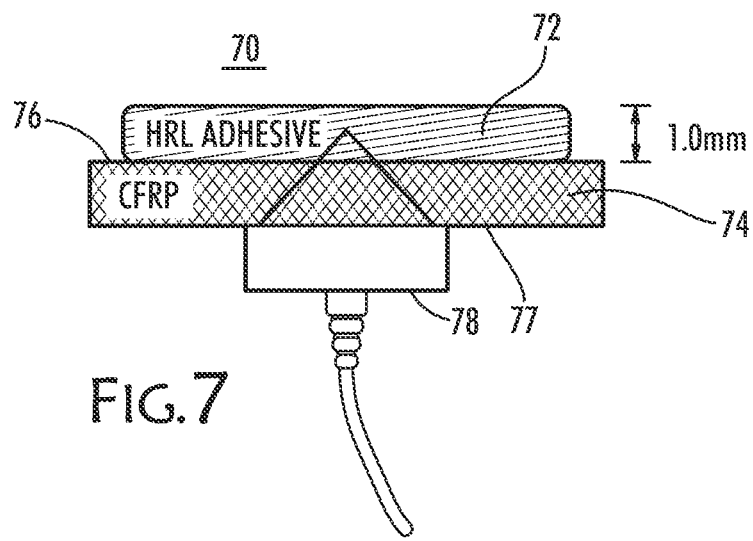
Figure 8:
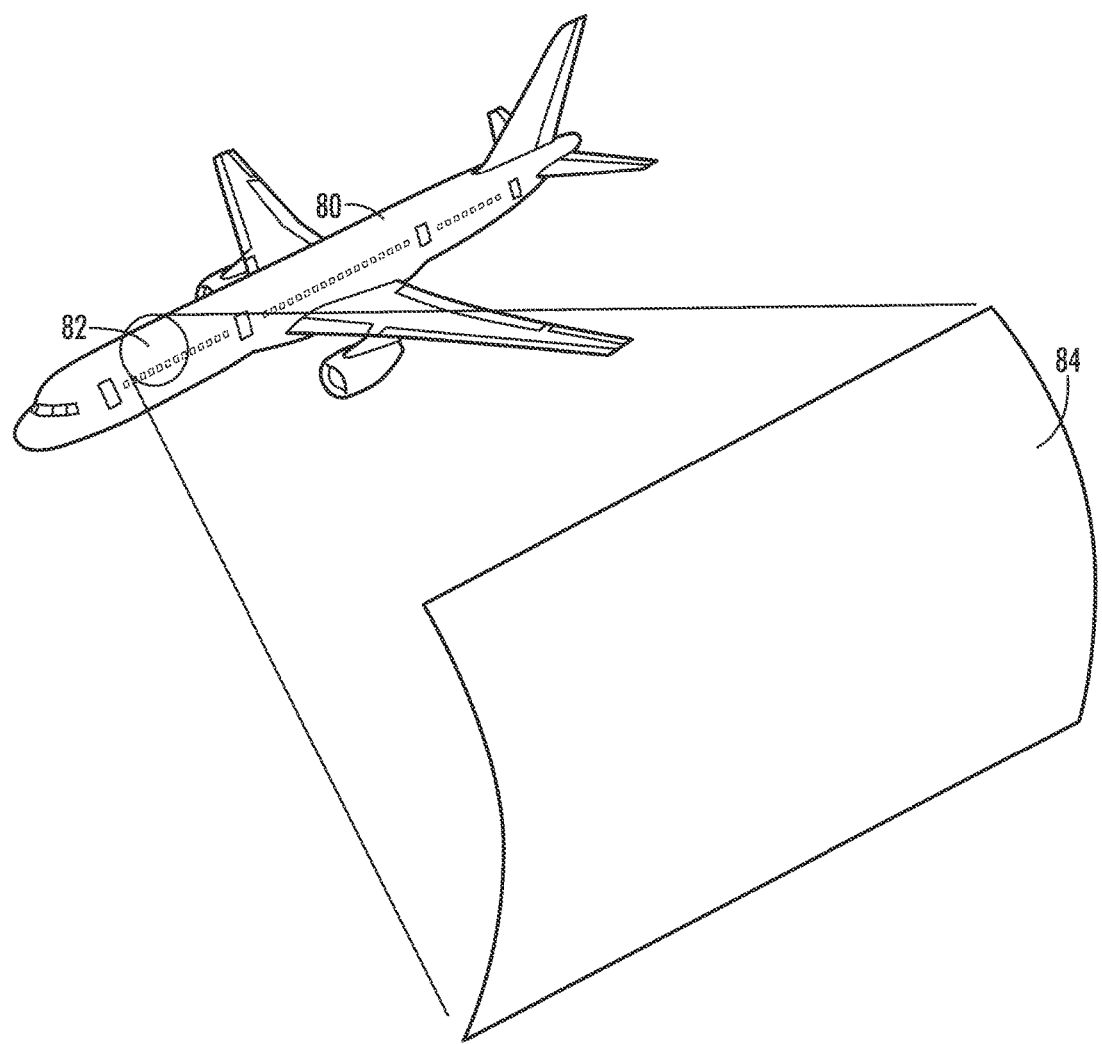

Having thus described variations of the disclosure in general terms, reference will now be made to the accompanying drawings, which are not necessarily drawn to scale, and wherein:

FIG. 1 is a graph showing the relationship between pot life and cure time;

FIG. 2 is a block diagram outlining an aspect of the present disclosure; a method for making an adhesive comprising a resin-based compound mixed with an encapsulated catalyst and a thiol curing agent that is exposed to an ultrasonic source to rupture the encapsulated catalyst and cure the adhesive;

FIG. 3 is a block diagram outlining an aspect of the present disclosure; a method for making an adhesive comprising an epoxy resin-based compound mixed with a thiol curing agent and an encapsulated tertiary amine catalyst that is exposed to an ultrasonic source to rupture the encapsulated catalyst and cure the adhesive;

FIG. 4 is a block diagram outlining an aspect of the present disclosure; a method for making an adhesive comprising an acrylate resin-based compound mixed with a thiol curing agent and an encapsulated primary or secondary amine catalyst that is exposed to an ultrasonic source to rupture the encapsulated catalyst and cure the adhesive;

FIG. 5 is a block diagram outlining an aspect of the present disclosure; a method for making an adhesive comprising an epoxy resin-based compound mixed with an encapsulated tri-fluorinated amine complex catalyst that is exposed to an ultrasonic source to rupture the encapsulated catalyst and cure the adhesive;

FIG. 6 is a schematic cross-sectional drawing of an ultrasonic curing of a liquid shim in place according to an aspect of the present disclosure;

FIG. 7 is a further schematic cross-sectional drawing of an ultrasonic curing of a liquid shim in place according to an aspect of the present disclosure; and FIG. 8 is drawing of an aircraft comprising component parts comprising liquid shims made from cured adhesives according to an aspect of the present disclosure.

DETAILED DESCRIPTION

Aspects of the present disclosure are directed to methods, systems, kits and compositions for controlling the curing of resin-based adhesives through the use of encapsulated initiators whose release may be accomplished when desired by applying focused ultrasonic energy to the resin system comprising the encapsulated initiators and/or accelerators. While the general concept of rupturing partially gas-filled capsules through the use of ultrasonic energy is known in biomedical fields, especially to facilitate drug release in vivo, aspects of the present disclosure combine the use of specially tailored resins and catalysts and/or catalyst pairs that accelerate cure time, and that can be triggered on-demand via exposing non-gas-filled encapsulated catalysts to ultrasonic energy, while also achieving a user-controlled pot life duration.

In manufacturing, gap-filling materials used to build up surfaces, or, for example as liquid shims, are understood to have been limited by their pot life, cure time, compressive strength, resistance to cyclic fatigue and optimal viscosity (for applying to vertical surfaces). Longer pot life allows the assembly of larger components and also aides in the cleanup of unused material. Excessively long pot life, however, interferes with the rate of manufacturing, as the shim needs time to fully cure. While mechanical properties of presently known liquid shims satisfy many production requirements, a significant limitation of known systems is the relationship between resin and catalyst creating the liquid shim materials, especially as they relate to either short pot life and cure time, or lengthy pot life and cure time. Ideally, a structural adhesive would have a lengthy pot life combined with a rapid cure time to achieve the greatest manufacturing efficiency. Frequently, heat has been used to achieve the desired curing trigger. However, certain manufacturing environments, for example the manufacture of aircraft, spacecraft, manned and unmanned vehicles, satellites, etc., will not permit useful active heating to be effectively incorporated into the manufacturing and assembly processes. FIG. 1 shows traditional cure kinetics of a system where the slow rise in viscosity and hardening of an adhesive essentially defines the pot life followed by a more rapid curing over a given time period. In contrast, according to an aspect of the present disclosure, an ideal cure profile is shown where a cure reaction can be triggered on-demand. According to aspects of this disclosure, an ideal cure profile would show complete lack of viscosity increase (through curing) until the application of a trigger (e.g. an ultrasonic energy trigger) leading to a rapid cure. This ideal cure profile has the effect of achieving a substantially infinite pot life (while the applied adhesive awaits curing) through the application of ultrasonic energy to rupture the encapsulated catalyst that is incorporated in the adhesive system.

According to one aspect, encapsulated primary (1°), secondary (2°) and tertiary (3°) amine compounds are selected and used as catalysts in an on-demand and predetermined regimen to accelerate the curing of epoxy/amine-, epoxy/thiol- and/or acrylate-based adhesive systems by applying and selectively targeting an ultrasound energy source through a solid or opaque boundary to non-thermally trigger curing by rupturing the encapsulated catalysts.

According to one aspect, the ultrasound source is one that is capable of transmitting energy through a solid or opaque substrate to a preselected and encapsulated catalyst target. The ultrasound energy source is capable of focusing high frequency energy in the range of about 0.5 to about 50 MHz. The solid substrate through which the ultrasound energy can be transmitted has a preferred thickness range of from about 0.1 to about 0.25 inches. Contemplated resin systems are epoxy-based, or acrylate-based. The contemplated epoxy resin-based and acrylate-based systems may comprise multifunctional amine and/or multifunctional thiol compounds.

According to an aspect of this disclosure, the capsule formation system may be based on an in situ polymerization technique such as, for example, water/oil/water ("w/o/w") double emulsion, or complex coacervate, etc. According to another aspect, an interfacial polymerization capsule shell comprises, for example, pentaerythritol tetrakis (3-mercapto proprionate) and trimethylolpropane triaciylate. The w/o/w double emulsion capsule shell may comprise polycaprolactone, polyacetic acid. Further the coacervate capsule may comprise cetyltrimethylammonium bromide (CTAB), polystyrene sulfonate (PSS) and (poly)allylamine (PAA). According to one aspect, the capsule or shell may have an average shell diameter of from about 0.1 to about 1000 microns. According to a further aspect, the shell has an average shell diameter of from about 10 to about 100 microns. In yet another aspect, the shell has an average shell wall thickness of from about 1 to about 10% of the shell diameter. In particular, it is noted that the encapsulation techniques adapted for use with aspects of the present disclosure are tailored so as to not introduce gas-filled regions into the encapsulated catalysts.

The accelerator compounds (tertiary amine catalysts) to be encapsulated may be chosen from a list including N,N dimethyldodecyl amine and homologues, DBU (1,8-Diazabicycloundec-7-ene), DBN (1,5-diazabicyclo[4, 3, 0]non-5-ene, trienthanolamine, piperazine, dimethylimidazol, 1-methylimidazole, nonylphenol, and/or 1-(2-aminoethyl) piperazine. Further commercially available products that may be useful as epoxy-based accelerators/catalysts include, ECA-39 (Dow), Accelerator 399 (Albermarle), etc.

Epoxy resins alone have now been determined to undergo rapid cure from boron trifluoro amine complexes including, for example, $BF_3$:amine complexes, through a cationic ring-opening polymerization process. Accordingly, further useful epoxy-based accelerators/catalysts include boron trichloride methyl amine, boron trichloride ethylamine, and homologues, boron trifluoride methyl amine, boron trifluoride ethylamine and homologues, boron trifluoride dimethylamine, boron trifluoride diethylamine, and homologues, boron trifluoride trimethylamine, boron trifluoride triethylamine, and homologues, boron trifluoride piperadine, boron trifluoride hexylamine, and combinations thereof, etc.

According to further aspects, the accelerators to be used with acrylate resin-based adhesive systems may be chosen from the list including primary and secondary amines, particularly aliphatic primary amines and aliphatic secondary amines, and combinations thereof.

Still further aspects of the present disclosure relate to including a plurality of differing encapsulated accelerators within an epoxy resin- and/or acrylate resin-based adhesive system.

To overcome known limitations, the present disclosure describes compositions and methods designed to use ultrasound energy as a method to selectively trigger the cure of epoxy or acrylate resin systems. Ultrasound-based triggers have the benefit of being able to transmit through solid or opaque media such as, for example, aluminum or carbon fiber reinforced plastic (CFRP) commonly found in aerospace manufacturing environments, and that are understood to not be reliant on a line-of-sight requirement (such as that required for infrared or UV curable systems).

Manufactured components having a gap between components, and which would be candidates for employing a liquid shim comprising an epoxy resin or acrylamide-based resin system according to the present disclosure may themselves comprise aluminum or CFRP. According to further aspects, an ultrasound signal source may be oriented or positioned on, for example, an exterior surface of an aluminum or CFRP component. The ultrasound source can be focused to a region or point located within the gap, for a predetermined time and at a predetermined intensity to insure the desire curing of the epoxy resin- or acrylamide resin-based compound acting as the liquid shim. It is further understood that, according to aspects of the present disclosure, and depending upon the desired curing regimen selected, the ultrasound source may contact a component exterior surface, may substantially contact a component exterior surface, may be located or positioned proximate to a component exterior surface, etc.

According to aspects of the present disclosure, resin systems are selectively cured at a predetermined rate by adding an encapsulated catalyst and providing an ultrasound source that can be selectively targeted to rupture the encapsulated catalyst. The resin is applied between dimensional mismatches existing between adjacent components, or, "gaps" that are ideally less than 3 mm, with the applied resin acting as a liquid shim. The components have an exterior surface and an interior surface. The resin is applied to the gap occurring between the interior surfaces of the adjacent components. An ultrasound source is disposed to a solid exterior surface of a component. When the ultrasound source is activated, the ultrasound energy serves to trigger the curing of the resin by rupturing the encapsulated resin catalysts in a targeted and preselected way.

In addition, materials, such as composite materials that may require the presence of an adhesive material to bond with the composite and "build up" an area of the composite material will benefit from aspects of the present disclosure. In such uses, the epoxy resin- and acrylate resin-based adhesive systems are applied to one surface of a material, but then can be cured by applying an ultrasound source that can be focused to a region or point located within the adhesive layer, for a predetermined time and at a predetermined intensity to insure the desired curing of the epoxy resin- or acrylate resin-based adhesive system. It is understood that if the adhesive is applied, for example, to the interior surface of a component, the ultrasound source is located proximate to the exterior surface of the component, or vice versa.

According to aspects of the present disclosure, the contemplated ultrasound sources are combined with an epoxy- or acrylate resin-based adhesive system designed to be susceptible to the application of acoustic enemy, so as to selectively trigger a rapid curing response in a predetermined and predictable fashion. Therefore, aspects of the present disclosure contemplate a resin system capable of being cured at an accelerated rate by adding an encapsulated catalyst species, as well as the capacity to segregate the resin from the catalyst until the desired time to trigger the reaction and curing.

Aspects of the present disclosure therefore provide an "on demand" ultrasound-triggered system for epoxy resin- and acrylate resin-based systems. Further aspects contemplate appropriate resin and encapsulated catalyst pairs capable of being triggered in response to applied ultrasound energy. Aspects of the present disclosure, therefore, combine to provide a process for controllably curing, in situ, epoxy resin- and acrylate resin-based adhesive systems through the use of an ultrasound trigger. Aspects of the disclosure further combine to achieve the goal of developing a curable epoxy resin- and/or acrylate resin-based composition for use as a liquid shim, with the composition having a virtually infinite pot life with a preselected user-triggered curing time and rate.

Further disclosed aspects comprise a resin system capable of being catalyzed to achieve an accelerated cure, the system comprising at least one type of encapsulated catalyst dispersed in a resin mix, and a mechanism for predictably rupturing the encapsulated catalyst within the resin by a user on-demand. FIG. 2 is a block diagram showing an aspect of the disclosure. According to system 20, resin-based compound 22 is mixed with a thiol 24 and an encapsulated catalyst 26. It is understood that the specific order of mixing the three components, may occur in any order. That is, the thiol 24 may be mixed with the resin-based compound 22, or the resin-based compound 22 and the encapsulated catalyst 26 may be mixed first, with the thiol 24 then added. The mixture is then exposed to an ultrasonic source 27, which causes the encapsulated catalyst 26 to rupture, causing the curing 28 of the adhesive mixture.

Some representative and contemplated, but non-exclusive, resin systems are set forth and described below.

In one contemplated system, the adhesive results from combining an amine catalyst with an epoxy resin and an accelerator. Left unaccelerated, this system will cure via primary and secondary amine catalysts with cure times approaching multiple hours to days.

Tertiary amine catalysts are contemplated as useful encapsulated accelerators/catalysts in a resin-based adhesive mixture, when the resin based system is an epoxy resin-based system with the presence of a thiol curing agent. Useful tertiary amines include N,N-dimethyldodecyl amine and homologues, DBU (1,8-Diazabicycloundec-7-ene), DBH (1,5-Diazabicyclo[4,3,0]non-5-ene), triethanolamine, piperazine, dimethylimidazole, 1-methylimidazole, nonylphenol, 1-(2-aminoethyl) piperazine, Epoxy Curing Agent ECA-39 (Dow), Accelerator 399 (Albermarle), and/or various other tertiary amines capable of accelerating cure when used at between 1-20% by weight with respect to the resin, and combinations thereof, etc.

In one system, an epoxy resin is combined with a thiol curing/hardening agent and an encapsulated tertiary amine to produce a stable, on-demand, rapidly curing epoxy compound. When uncatalyzed, the resin has an effectively infinite pot life. However, the release of a tertiary amine catalyst from an encapsulated state (e.g. in a shell, or capsule, etc.) dispersed throughout the adhesive resin system mixture provides a dramatically accelerated cure. Exemplary epoxy resins include diglycidyl ethers of bisphenol A; dicgycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, and combinations thereof, etc. Contemplated tertiary amines useful in an epoxy resin with thiol system include N,N-dimethyldodecyl amine and homologues, DBU (1,8-Diazabicycloundec-7-ene), DBH (1,5-Diazabicyclo[4,3,0]non-5-ene), triethanolamine, piperazine, dimethylimidazole, 1-methylimidazole, nonylphenol, 1-(2-aminoethyl) piperazine, Epoxy Curing Agent ECA-39 (Dow), Accelerator 399 (Albermarle), and various other tertiary amines capable of accelerating cure when used at between 1-20% by weight with respect to the resin, and combinations thereof, etc. This system is outlined in the block diagram shown as FIG. 3. According to system 30, epoxy resin-based compound 32 is mixed with a thiol 34 and an encapsulated tertiary amine catalyst 36. It is understood that the specific order of mixing the three components, may occur in any order. That is, the thiol 34 may be mixed with the epoxy resin-based catalyst 32, or the epoxy resin-based compound 32 and the encapsulated tertiary amine catalyst 36 may be mixed first, with the thiol 34 then added. The mixture is then exposed to an ultrasonic source 37, which causes the encapsulated catalyst 36 to rupture, causing the curing 38 of the adhesive mixture.

In another contemplated system, an acrylate resin is combined with a thiol curing/hardening agent and an encapsulated primary or secondary amine, or combination thereof to produce a stable, on-demand rapidly curing epoxy compound. When uncatalyzed, the resin has an effectively infinite pot life. However, the release of a primary or secondary amine catalyst from an encapsulated state (e.g. in a shell, or capsule, etc.) dispersed throughout the adhesive resin system mixture provides a dramatically accelerated cure. Exemplary acrylate resins include monoacrylates, diacrylates, triacrylates, tetraacrylates, pentaacrylates and combinations thereof. Contemplated thiol curing agents include pentaerythritol tetrakis(3-mercaptopropionate); trimethylolpropane tris(3-mercaptopropionate); 1,3,4-thiadiazole-2,5-dithiol; poly(ethylene) glycol dithiol; toluene dithiol; benzene dithiol; 1,2-ethanedithiol (and increasing MW alkane dithiol); tris[2-(3-mercaptopropionyloxy)ethyl] isocyanurate (and other polyols grafted onto isocyanurate backbones), and combinations thereof, etc. Contemplated primary and secondary amines to be encapsulated include, particularly, aliphatic primary amines and aliphatic secondary amines. This system is outlined in the block diagram shown as FIG. 4. According to system 40, acrylate resin-based compound 42 is mixed with a thiol 44 and an encapsulated primary or secondary amine catalyst 46. It is understood that the specific order of mixing the three components, may occur in any order. That is, the thiol 44 may be mixed with the acrylate resin-based catalyst 42, or the acrylate resin-based compound 42 and the primary or secondary amine encapsulated catalyst 46 may be mixed first, with the thiol 44 then added. The mixture is then exposed to an ultrasonic source 47, which causes the encapsulated primary or secondary amine catalyst 46 to rupture, causing the curing 48 of the adhesive mixture.

According to yet another contemplated system, an epoxy resin is combined with an encapsulated trifluoro amine compound to produce a stable, on-demand rapidly curing epoxy compound. When uncatalyzed, the resin has an effectively infinite pot life. However, the release of a trifluoro amine compound catalyst from an encapsulated state (e.g. in a shell, or capsule, etc.) dispersed throughout the adhesive resin system mixture provides a dramatically accelerated cure. Exemplary epoxy resins include digylcidyl ethers of bisphenol A; dicgycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, and combinations thereof, etc. Contemplated encapsulated trifluoro amine compounds include boron trichloride methyl amine, boron trichloride ethylamine, and homologues, boron trifluoride methyl amine, boron trifluoride ethylamine and homologues, boron trifluoride dimethylamine, boron trifluoride diethylamine, and homologues, boron trifluoride trimethylamine, boron trifluoride triethylamine, and homologues, boron trifluoride piperadine, boron trifluoride hexylamine, and combinations thereof.

This system is outlined in the block diagram shown as FIG. 5. According to system 50, epoxy resin-based compound 52 is mixed with an encapsulated tri-fluoro amine complex catalyst 54. The mixture is then exposed to an ultrasonic source 56, which causes the encapsulated catalyst 54 to rupture, causing the curing 58 of the adhesive mixture.

Methods of encapsulating accelerator species include those methods known to those skilled in the field of polymer-based encapsulation. Such encapsulation methods include layer-by-layer complex coacervation; double emulsion techniques; interfacial polymerization; silica-shell microencapsulation; nanoparticle embedded microencapsulation, etc.

Layer-by-layer complex coacervation involves the emulsification of catalyst droplets (typically tertiary amines) in an aqueous solution stabilized by a charged surfactant. An oppositely charged high molecular weight polyelectrolyte is then introduced into the aqueous phase to complex with the surfactant charge. Polyelectrolytes of alternating charge can then be added sequentially to increase capsule wall thickness and robustness.

In double emulsion techniques, an aqueous amine-loaded solution is introduced into organic solvent containing dissolved polymer with surfactant, and produces a water-in-oil emulsion, followed by slow addition of this solution into a larger aqueous mixture-containing surfactant. The organic phase is slowly evaporated with stirring to condense out the rigid polymer shell.

Interfacial polymerization involves a catalyst to be encapsulated being dispersed in a continuous phase with a component added to react with the catalyst at the interface. Formation of the capsule or shell wall is promoted by reacting functional groups that can be catalyzed or uncatalyzed. The thickness of the capsule layer (i.e. the shell wall) is limited by the diffusion of reactive species as the layer is polymerized.

Silica shell microencapsulation involves a hydrophobic catalyst being emulsified with surfactants containing hydroxyl groups in a continuous phase of basic water. Tetraethyl orthosilicate, or similar silyl ether capable of condensation reactions, is hydrolyzed and added drop-wise to a stirring solution of emulsified catalyst forming a silica shell around the emulsion.

Nanoparticle embedded microencapsulation is a technique involving the emulsification of catalyst droplets (typically tertiary amines) in an aqueous solution stabilized by a charged surfactant. An oppositely charged high molecular weight polyelectrolyte is then introduced into the aqueous phase to complex with the surfactant charge. Polyelectrolytes of alternating charge can then be added sequentially to increase capsule wall thickness and robustness. The nanoparticles can be substituted in for a polyelectrolyte layer, thus embedding the particles in the shell of the microparticle.

Ultrasonic sources for rupture of capsules can involve a range of frequencies from about 20 kHz to about 50 MHz. According to aspects of the present disclosure, it is particularly advantageous to target frequencies corresponding to the natural frequencies of a hollow shell so as to best promote resonance and capsule disruption. The predictive equation for natural frequency of a shell is determined by shell dimensions such as radius and wall thickness along with the shell material properties such as Poisson's ratio, Young's modulus and density. For capsules in the range of from about 10 to about 100 μm with shell wall thickness that is 1-10% of the radius, the natural frequency of a shell corresponds to frequencies from between about 0.5 to about 10 MHz.

$$freq = \frac{\alpha}{2\pi R} \sqrt{\frac{E}{\rho(1-v^2)}}$$

$$\alpha = \sqrt{\frac{2(1+v)}{1 + \frac{h^2}{12\ R^2}}}$$

R=Radius et shell midpoint
h=Shell thickness
ρ=shell density
ν=Poisson ratio
E=Young's Modulus Known ultrasound sources range from frequencies between about 20 kHz and about 50 MHz. Probe tip instruments capable of submersion in a liquid, and that can disperse acoustic energy isotropically, are known to perform in a low frequency range of from about 20 kHz to about 100 kHz. Such isotropic sources direct large fractions of generated energy into areas that are not of interest to the aspects of the present disclosure. Due to the particular geometry requirements concerning aspects of the present disclosure relating to liquid shims for metal and CFRP-containing components, it has been discovered that an efficient ultrasound dispersing system would take the form of a probe that is placed into direct contact, or substantially direct contact with an aluminum or CFRP component panel. In this way, the ultrasonic generated acoustic energy is focused onto a concentrated area that is set substantially at the distance where the shim material resides. Aspects of the present disclosure contemplate modifying focused ultrasound technology and sources manufactured from curved piezoelectric ceramic heads capable of being assembled into handheld-sized probes tuned to frequency ranges between from about 0.5 to about 50 MHz. Such a system would be advantageous, both because of the high level of acoustic energy and pressure (about 1 MPa), and the frequency of the applied energy residing near the natural frequency of the catalyst particles (from about 1 to about 10 MHz for a particle size of from about 10 to about 100 μm).

FIGS. 6 and 7 show a diagram of a focused high intensity ultrasound probe placed in direct contact with an aluminum (Al) or a carbon fiber reinforced plastic (CFRP) panel of a component. As shown in FIG. 6, an ultrasound triggering system 60 comprises an ultrasound (US) source probe 62 located proximate to and in contact with the exterior surface 66 of a first component 64 having a first interior surface 64*a*. A second component 65 has an interior surface 65*a*. As mentioned, the components 64, 65 may be made from a solid or opaque material such as, for example, aluminum or carbon fiber reinforced plastic (CFRP). The components 64, 65 are located a distance apart, creating a gap 67 between components 64, 65. The gap 67 is understood to be less than about 3 mm. A liquid shim material 68 is disposed as a sandwiched layer between interior surfaces 64*a* and 65*a* of components 64, 65. The geometry of the head of the ultrasound probe 62 is able to take into account the thickness of the component wall and location of a liquid shim material layer 68 to deposit the highest acoustic energy density within the shim material layer to give the greatest potential for capsule rupture and successful cure trigger.

FIG. 7 shows an experimental setup for a system 70 where a 1 mm layer of a non-cured epoxy-resin containing adhesive layer 72 deposited on an interior surface 76 of a carbon fiber reinforced plastic (CFRP) panel 74. The adhesive layer comprised an encapsulated catalyst. An ultrasonic transducer 78 is placed on the exterior surface 77 of CFRP panel 74. Upon activation of the ultrasound transducer 78 (at an energy of 1 MHz over a curing duration of 60 seconds), the adhesive layer was cured. As shown in FIG. 7, the CFRP panel 74 has an adhesive 72 provided to demonstrate an "open-face" aspect, for curing an adhesive layer through applying an ultrasound energy source to rupture encapsulated catalyst present in the adhesive mix. Such "open-face" systems may occur in manufacturing, for example, when materials, such as, composite materials require the presence of an adhesive material to bond with the composite and "build up" an area of the composite material. Such open-face systems will benefit from aspects of the present disclosure. In such uses, the adhesive systems are applied to one surface of a material, but then can be cured by applying an ultrasound source that can be focused to a region or point located within the adhesive layer, for a predetermined time and at a predetermined intensity to insure the desire curing of the adhesive system. It is understood that if the adhesive is applied, for example, to the interior surface of a component, the ultrasound source may be located proximate to the exterior surface of the component, or vice versa. While aspects of the present disclosure contemplate curing an adhesive "through" a solid structure, aspects of the present disclosure also contemplate positioning an ultrasound source proximate to, but not necessarily in contact with, the adhesive layer itself.

Examples for Catalyst Encapsulation

Layer-by-Layer—Complex Coacervate

Oil in water emulsions were prepared by processing 98 g of NaOH (0.01 M) and 2 g of dimethyltetradecylamine (DMTDA) and 0.02 g of cetyltrimethylammonium bromide (CTAB) by two runs through a microfluidizer. The formed emulsion was stirred at high speed via stir bar for 45 minutes, while 200 mg of poly(styrene sulfonate) (PSS) in 50 mL of water was added drop-wise to the emulsion via syringe pump. Formation of capsules was confirmed via optical microscope.

Double Emulsion Solvent Evaporation

Poly(caprolactone) shell material (1 g) was dissolved in 40 mL of dichloromethane. An internal water phrase was prepared by combining 1.5 g of NaOH (0.01 M) solution with 0.03 g sodium dodecylbenzenesulfonate (SDBS), and 1.5 g of triethylenetetramine. The internal water phrase was added to the oil phase and the resulting mixture was agitated via a dispersion disk at 1900 rpm for 15 minutes. The first emulsion was then added to 250 mL of a 0.16 wt. % solution of SDBS in water, which was agitated by stir bar. The solution was maintained at 40-45° C., for approximately 6 hours until the dichloromethane had evaporated leaving hard poly(caprolactone) shells. Formation of capsules was confirmed via optical microscope. Subsequent experiments varied amounts of poly(caprolactone) in order to create shell walls of varying thickness.

Interfacial Polymerization

An internal oil phase composed of 20 g dimethyl paratoluidine (DMPT), 15.94 g pentaerythritol tetrakis (3-mercapto-propionate) (PTMP), and 11.85 g trimethylolpropane triacrylate (TMPTA) were mixed and suspended in 500 mL 1.28 wt. % poly (vinyl alcohol) in deionized water via dispersion disk at 2100 rpm for 30 minutes. The dispersion disk rate was then decreased to 1700 rpm, 0.9 mL octylamine was added, and agitation was allowed to continue for one hour. Formation of capsules was confirmed via optical microscope.

Silica-Shell Microcapsule Preparation

In a beaker, Pluronic P123 (0.08 g) was dispersed in water containing NaOH (0.1 M NaOH, 50 mL). The solution was heated to 35° C. under constant stirring until Pluronic P123 was fully dissolved. Next, N,N-dimethyl tetradecylamine (5 g, 20 millimole) was added to the solution and continuously stirred for 3 hours to form stable emulsions. In a separate beaker, tetraethyl orthosilicate (TEOS, 5 g 24 millimole) was added to an HCl aqueous solution (pH 2.45) and stirred at 35° C. until a homogenous solution was obtained. The contents from this beaker were then added to the emulsion solution drop-wise, and allowed to stir for 24 hours to complete microcapsule assembly. The white precipitate at the surface of the solution was collected, rinsed and allowed to dry. N,N-dimethyltetradecylamine having a lower density than water is expected to be at the surface after encapsulation.

Capsule Rupturing

Capsules prepared according to each outlined method above, were suspended in a variety of low viscosity solvents (methanol, acetone, and water) and subjected to low frequency ultrasonic waves. Capsule rupturing was monitored by colorimetry (ninhydrin test), pH analysis, and optical microscopy. Further, capsules prepared by solvent evaporation and interfacial polymerization were isolated, incorporated into an epoxy/thiol resin, and disturbed by both ultrasonic waves and pressure.

Focused Ultrasonic Curing

Aluminum-filled adhesive paste was prepared by combining 1.25 g of a 3:1 mixture of Araldite MY 721 to Araldite EPN 9850, 1.25 g PTMP, 2.5 g aluminum powder (Toyal 5621) and 0.25 g DMTDA (amount adjusted for encapsulated DMTDA using 1% w/w) and mixing via centrifugal mixer. The paste was applied in about ⅛" thick strip on an aluminum substrate and tested for Shore D hardness as the cure proceeded. A 1 MHz focused ultrasound probe (Precision Acoustics, Dorchester UK) was applied to the back side of a carbon fiber reinforced plastic (CFRP) panel (1.52 mm thick) using a custom made polymeric lens between the probe head and CFRP backside. Acoustic gel was applied to eliminate air gaps between the probe head and sample. The probe head was submerged in a water bath with the CFRP panel exposed on the surface and a 1 MHz sinusoidal voltage signal (80V peak to peak) applied for 60 secs.

The preferred variations and alternatives of the present disclosure relate to the manufacture and use of components and parts of any dimension having gaps for which the use of a liquid shim would be required or desirable, including the manufacture and use of components and parts in the fabrication of larger parts and structures. Such devices include, but are not limited to, components and parts designed to be positioned on the exterior or interior of atmospheric and aerospace vehicles and other objects, and structures designed for use in space or other upper-atmosphere environments, such as, for example manned or unmanned vehicles and objects. Contemplated objects include, but are not limited to vehicles, such as, for example, aircraft, spacecraft, satellites, rockets, missiles, etc. and therefore include manned and unmanned aircraft, spacecraft, terrestrial, non-terrestrial, and even surface and sub-surface waterborne vehicles and objects.

FIG. 8 is a drawing of an aircraft 80 with a section 82 enlarged and showing a fuselage panel 84 comprising components having liquid shims (not shown) present in component parts used to construct fuselage panel 84.

When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations. While the preferred variations and alternatives of the present disclosure have been illustrated and described, it will be appreciated that various changes and substitutions can be made therein without departing from the spirit and scope of the disclosure.

What is claimed is:

1. A method for making an on-demand adhesive comprising the steps of:
    mixing a resin-based compound with a non-gas-filled encapsulated catalyst to form an uncured resin-based adhesive,
    depositing said uncured resin-based adhesive onto component, said catalyst encapsulated within a shell, said shell having an average shell diameter of from about 1 to about 1000 microns, and said shell having an average shell wall thickness of from about 1 to about 10% of the shell diameter;
    directing non-thermal ultrasonic energy from an ultrasonic energy source through the component, said ultrasonic energy source emitting ultrasonic energy from a curved piezoelectric ceramic probe head with the emitted ultrasonic energy tuned to an ultrasonic energy in the range of from about 0.5 to about 50 MHz;
    focusing the non-thermal ultrasonic energy through the component to a region or point located in the deposited adhesive;
    targeting non-thermal ultrasonic energy frequencies corresponding to a natural resonant frequency of the shell;
    rupturing the non-gas-filled encapsulated catalyst; and
    curing on-demand the uncured resin-based adhesive.

2. The method of claim 1, wherein the resin-based compound comprises an epoxy resin-based compound, and the encapsulated catalyst is a compound selected from the group consisting of: boron trichloride methyl amine, boron trichloride ethylamine, and homologues, boron trifluoride methyl amine, boron trifluoride ethylamine and homologues, boron trifluoride dimethylamine, boron trifluoride diethylamine, and homologues, boron trifluoride trimethylamine, boron trifluoride triethylamine, and homologues, boron trifluoride piperadine, boron trifluoride hexylamine, and combinations thereof.

3. The method of claim 1, wherein the resin-based compound is an epoxy resin-based compound selected from the group comprising: diglycidyl ethers of bisphenol A; diglycidyl ethers of bisphenol F; N,N,N',N'-tetraglycidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate; glycerol diglycidyl ether; trimethylolpropane triglycidyl ether, and combinations thereof.

4. The method of claim 3, wherein the step of mixing a resin-based compound with an encapsulated catalyst to form an uncured resin-based adhesive further comprising: mixing a thiol-based curing agent with the epoxy resin-based compound, wherein the thiol-based curing agent is selected from the group consisting of: pentaerythritol tetrakis(3-mercaptopropionate); trimethylolpropane tris(3-mercaptopropionate); 1,3,4-thiadiazole-2,5-dithiol; poly (ethylene glycol) dithiol; toluene dithiol; benzene dithiol; 1,2-ethanedithiol; tris[2-(3-mercaptopropionyloxy)ethyl] isocyanurate, other polyols grafted onto isocyanurate backbones and combinations thereof.

5. The method of claim 4, wherein the encapsulated catalyst is selected from the group consisting of: N,N dimethyldodecyl amine and homologues; (1,8-Diazabicycloundec-7-ene); (1,5-diazabicyclo[4, 3, O]non-5-ene), trienthanolamine, piperazine, dimethylimidazol, 1-methylimidazole; nonylphenol; 1-(2-aminoethyl) piperazine, and combinations thereof.

6. The method of claim 1, wherein the resin-based compound comprises an acrylate-based compound,
    wherein the step of mixing a resin-based compound with an encapsulated catalyst to form an uncured resin-based adhesive further comprises mixing a thiol-based curing agent with the resin-based compound and encapsulated compound, and
    wherein the thiol-based curing agent is selected from the group consisting of:
    pentaerythritol tertrakis(3-mercaptopropionate); trimethylolpropane tris(3-mercaptopropionate); 1,3,4-thiadiazole-2,5-dithiol; poly(ethylene glycol) dithiol; toluene dithiol; benzene dithiol; 1,2-ethanedithiol; tris[2-(3-mercaptopropionyloxy)ethyl]isocyanurate other polyols grafted onto isocyanurate backbones, and combinations thereof.

7. The method of claim 6, wherein the encapsulated catalyst is selected from the group consisting of: aliphatic primary amines, aliphatic secondary amines, and combinations thereof.

8. The method of claim 6, wherein, the acrylate resin-based compound is selected from the group comprising: monoacrylates, diacrylates, triacrylates, tetraacrylates, pentaacrylates and combinations thereof.

9. A method for applying and curing an on-demand adhesive comprising the steps of:
    mixing a resin-based compound with a non-gas-filled encapsulated catalyst to form an uncured adhesive material, said catalyst encapsulated within a shell, said shell having an average shell diameter of from about 1 to about 1000 microns, and said shell having an average shell wall thickness of from about 1 to about 10% of the shell diameter;
    applying the uncured adhesive material onto an interior surface of a first component having an interior surface and an exterior surface;
    positioning an ultrasonic energy source proximate to the exterior surface of the first component said first component having a thickness ranging from about 0.1 to about 0.25 inches;
    directing non-thermal ultrasonic energy from an ultrasonic energy source through the first component and focused to a region or point in the uncured adhesive material applied onto the first component, said ultrasonic energy source emitting ultrasonic energy from a curved piezoelectric ceramic probe head with the emitted ultrasonic energy tuned to an ultrasonic energy in the range of from about 0.5 to about 50 MHz;
    focusing the ultrasonic energy through the component to a region or point located in the deposited adhesive;
    targeting ultrasonic energy frequencies corresponding to a natural resonant frequency of the shell;
    rupturing the encapsulated catalyst; and
    curing on-demand the uncured adhesive material.

10. The method of claim 9, further comprising the step of: prior to directing ultrasonic energy, applying the uncured adhesive material onto an interior surface of a second component having an interior surface and an exterior surface substantially simultaneously with the step of applying the uncured adhesive material onto an interior surface of a first component having an interior surface and an exterior surface, said second component oriented proximate to the first component, such that a gap exists between the interior surface of the first component and the interior surface of the second component.

11. An uncured adhesive material, said uncured adhesive material comprising in a mixture: a resin-based compound; and a non-gas-filled encapsulated catalyst; wherein the catalyst is encapsulated within a shell, said shell having an average shell diameter of from about 1 to about 1000 microns, and said shell having an average shell wall thickness of from about 1 to about 10% of the shell diameter, and wherein the shell ruptures when a predetermined amount of energy is received by the shell from an ultrasonic energy source, said ultrasonic energy source configured to emit emitting ultrasonic energy from a curved piezoelectric ceramic probe head with the emitted ultrasonic energy tuned to an ultrasonic energy range of from about 0.5 to about 50 MHz, and wherein the uncured adhesive material is configured to be cured on-demand.

12. The adhesive material of claim 11, wherein the resin-based compound comprises an epoxy resin-based compound, and the encapsulated catalyst is a compound selected from the group consisting of: boron trichloride methyl amine, boron trichloride ethylamine, and homologues, boron trifluoride methyl amine, boron trifluoride ethylamine and homologues, boron trifluoride dimethylamine, boron trifluoride diethylamine, and homologues, boron trifluoride trimethylamine, boron trifluoride triethylamine, and homologues, boron trifluoride piperadine, boron trifluoride hexylamine, and combinations thereof.

13. The adhesive material of claim 11, wherein the resin-based compound comprises an epoxy resin-based compound selected from the group comprising: diglycidyl ethers of bisphenol A; diglycidyl ethers of bisphenol F; N,N,N',N'-tetraglycidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate; glycerol diglycidyl ether; trimethylolpropane triglycidyl ether, and combinations thereof.

14. The adhesive material of claim 13, further comprising a thiol-based curing agent mixed with the epoxy resin-based compound, wherein the thiol-based curing agent is selected from the group consisting of: pentaerythritol tetrakis(3-mercaptopropionate); trimethylolpropane tris(3-mercaptopropionate); 1,3,4-thiadiazole-2,5-dithiol; poly(ethylene glycol) dithiol; toluene dithiol; benzene dithiol; 1,2-ethanedithiol; tris[2-(3-mercaptopropionyloxy)ethyl] isocyanurate, other polyols grafted onto isocyanurate backbones and combinations thereof.

15. The adhesive material of claim 14, wherein the encapsulated catalyst is selected from the group consisting of: N,N dimethyldodecyl amine and homologues; (1,8-Diazabicycloundec-7-ene); (1,5-diazabicyclo[4, 3, 0]non-5-ene, trienthanolamine, piperazine, dimethylimidazol, 1-methylimidazole; nonylphenol; 1-(2-aminoethyl) piperazine, and combinations thereof.

16. The adhesive material of claim 11, wherein the resin-based compound comprises an acrylate resin-based compound, and a thiol-based curing agent is mixed with the resin-based compound and encapsulated compound, and wherein the thiol-based curing agent is selected from the group consisting of: pentaerythritol tetrakis(3-mercaptopropionate); trimethylolpropane tris(3-mercaptopropionate); 1,3,4-thiadiazole-2,5-dithiol; poly(ethylene glycol) dithiol; toluene dithiol; benzene dithiol; 1,2-ethanedithiol; tris[2-(3-mercaptopropionyloxy)ethyl]isocyanurate, other polyols grafted onto isocyanurate backbones, and combinations thereof.

17. The adhesive material of claim 16, wherein the encapsulated catalyst is selected from the group consisting of: aliphatic primary amines, aliphatic secondary amines, and combinations thereof.

18. The adhesive material of claim 16, wherein, the acrylate resin-based compound is selected from the group comprising: monoacrylates, diacrylates, triacrylates, tetraacrylates, pentaacrylates and combinations thereof.

19. A component comprising the adhesive material of claim 11.

20. An aircraft comprising the component of claim 19.

21. The method of claim 1, wherein the component comprises at least one material selected from the group comprising: aluminum and carbon fiber reinforced plastic.

* * * * *